US008788307B2

(12) United States Patent
Wright et al.

(10) Patent No.: US 8,788,307 B2
(45) Date of Patent: Jul. 22, 2014

(54) SYSTEM FOR USING PERSONALITY TRAIT IDENTIFICATION TO MATCH CONSUMERS WITH BUSINESSES

(75) Inventors: Carson Wright, Baltimore, MD (US); Daniel Sines, Middle River, MD (US); Joshua Spears, Baltimore, MD (US); Colin Murray, Churchville, MD (US); Jason Truluck, Baltimore, MD (US); Noreen Honeycutt, Baltimore, MD (US); Randie V. Ursal, Baltimore, MD (US)

(73) Assignee: Woofound, Inc., Baltimore, MD (US)

( * ) Notice: Subject to any disclaimer, the term of this patent is extended or adjusted under 35 U.S.C. 154(b) by 0 days.

(21) Appl. No.: 13/478,817

(22) Filed: May 23, 2012

(65) Prior Publication Data

US 2013/0060604 A1 Mar. 7, 2013

Related U.S. Application Data

(60) Provisional application No. 61/530,926, filed on Sep. 2, 2011.

(51) Int. Cl.
*G06Q 10/00* (2012.01)
*G06Q 30/00* (2012.01)
*G06Q 30/08* (2012.01)
*G06Q 30/02* (2012.01)

(52) U.S. Cl.
CPC ............. *G06Q 30/02* (2013.01); *G06Q 30/08* (2013.01)
USPC ....................................... 705/7.11

(58) Field of Classification Search
None
See application file for complete search history.

(56) References Cited

U.S. PATENT DOCUMENTS

| | | | | |
|---|---|---|---|---|
| 6,655,963 | B1 * | 12/2003 | Horvitz et al. | 434/236 |
| 7,342,583 | B2 * | 3/2008 | Behar et al. | 345/440 |
| 7,454,357 | B2 * | 11/2008 | Buckwalter et al. | 705/346 |
| 7,552,060 | B2 * | 6/2009 | Vest | 705/1.1 |
| 8,195,668 | B2 * | 6/2012 | Drennan et al. | 707/748 |
| 8,341,101 | B1 * | 12/2012 | Treiser | 706/45 |
| 8,473,490 | B2 * | 6/2013 | Bonilla et al. | 707/732 |
| 2003/0204437 | A1 * | 10/2003 | Flender et al. | 705/10 |

(Continued)

OTHER PUBLICATIONS

Gregory J. Boyle, Myers-Briggs Type Indicator (MBTI): Some psychometric limitations, 1995, Human Social Sciences Papers, Faculty of Humanities and Social Sciences, pp. 2-4.*

(Continued)

*Primary Examiner* — Justin M Pats
*Assistant Examiner* — Nancy Prasad
(74) *Attorney, Agent, or Firm* — Larry J. Guffey; Oliver & Grimsley, LLC

(57) ABSTRACT

An improved method for providing a consumer matching service, of the type having the steps of establishing a database of participating businesses which includes information on the experiences available from these businesses and also collecting consumer contact and experience sought information, includes the steps of: (a) establishing a consumer personality trait profile in which one's personality traits are predictive of how one is most likely to make a purchase or selection decision as it relates to choosing between an array of experiences available to a consumer, (b) ascribing to each of the available experiences similar personality traits, and (c) matching the consumer personality trait profile to the personality traits ascribed to the available items so as to compile for the consumer a list of ranked businesses which offer the experiences being sought by the consumer and most optimally match to the consumer's personality trait profile.

17 Claims, 7 Drawing Sheets

(56) References Cited

U.S. PATENT DOCUMENTS

| | | | |
|---|---|---|---|
| 2004/0162821 A1* | 8/2004 | Buckwalter et al. | 707/3 |
| 2004/0210661 A1* | 10/2004 | Thompson | 709/228 |
| 2004/0260781 A1* | 12/2004 | Shostack et al. | 709/207 |
| 2005/0209909 A1* | 9/2005 | Dull et al. | 705/10 |
| 2006/0041480 A1* | 2/2006 | Briggs | 705/14 |
| 2006/0149614 A1* | 7/2006 | Suzuki et al. | 705/10 |
| 2006/0282306 A1* | 12/2006 | Thissen-Roe | 705/11 |
| 2007/0012325 A1* | 1/2007 | Greenwald | 128/898 |
| 2007/0053513 A1* | 3/2007 | Hoffberg | 380/201 |
| 2007/0078869 A1* | 4/2007 | Carr et al. | 707/100 |
| 2007/0192106 A1* | 8/2007 | Zilca | 704/270 |
| 2007/0282621 A1* | 12/2007 | Altman et al. | 705/1 |
| 2008/0126426 A1* | 5/2008 | Manas et al. | 707/104.1 |
| 2008/0263446 A1* | 10/2008 | Altberg et al. | 715/706 |
| 2010/0077032 A1* | 3/2010 | Drennan et al. | 709/206 |
| 2010/0145869 A1* | 6/2010 | Brown | 705/319 |
| 2011/0029566 A1* | 2/2011 | Grandison et al. | 707/783 |

OTHER PUBLICATIONS

Pearson, Marcia, The Dichotomous Relationship Between Personality Traits and Repatriation Decisions by Information Technology Workers, 2013, UMI Disertations Publishing.*

Anderson, Philip H. and Lawton, Leigh, Development in Business Simulation & Experiential Exercises, Personality Types and Total Enterprise Simulation Performance, 1991, vol. 18, pp. 1-4.*

Snead T. Dichotomous musical worlds: Interactions between the musical lives of adolescents and school music-learning culture. [serial online]. n.d.;(2010), p. n/aAccessed May 30, 2014.*

Chatman J. Matching People and Organizations: Selection and Socialization in Public Accounting Firms. Administrative Science Quarterly [serial online]. Sep. 1991;36(3):459-484. Available from: Business Source Complete, Ipswich, MA. Accessed May 30, 2014.*

Nordvik, Hilmar. "Relationships Between Holland's Vocational Typology, Schein's Career Anchors and Myers-Briggs' Types". Journal of Occupational and Organizational Psychology, Sep. 1996, pp. 263-275, vol. 69, Issue 3, published by the British Psychological Society, Uk. (Generalized Reference).

Holland, John. "Making Vocational Choices: A Theory of Careers," Prentice Hall, 1973, US. (Generalized Reference).

Berens & Nardi, "The 16 Personality Types, Descriptions & Self-Discovery," Telos Publications, 1999, US. (Generalized Reference).

* cited by examiner

| competitive | non-competitive |
|---|---|
| needs instant gratification | can delay gratification |
| attention-seeking | private |
| introverted | extroverted |
| aggressive | passive |
| attached | detached |
| independent | dependent |
| erratic | steady |
| focused | distractible |
| intuitive | rational |
| optimistic | pessimistic |
| compassionate | unfeeling |

(a)

(b)

(c)

Personality Trait Assigned:

Competitive

Physically Drive

SYSTEM FOR USING PERSONALITY TRAIT IDENTIFICATION TO MATCH CONSUMERS WITH BUSINESSES

CROSS-REFERENCE TO RELATED APPLICATION

This application claims the benefit of Provisional Patent Application No. 61/530,926, filed Sep. 2, 2011 by the present inventors. The teachings of this application are incorporated herein by reference to the extent that they do not conflict with the teaching herein.

BACKGROUND OF THE INVENTION

1. Field of the Invention

The present invention relates generally to the operation of a consumer matching service. Specifically, the invention relates to a system for matching a consumer with those businesses that are most likely to provide the experiences, events, services or products which will bring the most satisfaction to the consumer.

2. Description of the Related Art

Online consumer matching services seek to match consumers with service providers. The techniques utilized to create these matches often depend on the development of a database of service providers in which a key component of these databases is a ranking of the various service providers according to information accumulated by the matching service on the satisfaction levels of some of the prior users of the service providers. Other than typical consumer profile information (e.g., name, address, phone number) and general purchasing requirements (services sought, pricing sensitivities, geographic considerations, general preferences—e.g., "American style", "Italian," "Classical"), little further information is collected by the matching service from the consumer. In addition, the matches typically are one-to-one and match a consumer preference with a direct attribute of the service provider or business.

There is a significant level of consumer feedback on many of these matching services which suggests widespread dissatisfaction with many of their matches. This result is often attributed to the fact that the number of prior users contributing to a service provider's ranking is too small and therefore not a representative sample of all of a service provider's prior customers or users. Also, "user reviews" and "comments" often are biased, or the particular preference of the reviewer is not made apparent to the consumer. Accordingly, there is a need for improved consumer matching services.

SUMMARY OF THE INVENTION

Recognizing the need for the development of improved consumer matching services, the present invention is generally directed to overcoming the problems and disadvantages exhibited by existing, consumer matching services.

The present invention relates to the functions and operation of an improved consumer matching service. It is implementable on a computer that takes as its input simple consumer responses or selections according to whether the consumer chooses "me" or "not me" in response to their individual preferences to a series of images which are shown to the consumer who may be seeking a certain experience (e.g. service, event, experiential activity), and wherein each image being shown to the consumer been tagged/assigned certain ranked personality traits according to the matching service's perception of the psychological content of the images. These responses to the tagged images are used to formulate the consumer's personality trait profile. These are then matched against a database of experiences that have been ascribed similar tags/personality traits and that are available from those businesses (e.g., providers of a wide range of services, events and experiential activities) which have registered with the database. The result of this matching is the compiling for the consumer of a list of ranked businesses from the business database which offer the experience being sought by the consumer and most optimally matched to the compatibility of the consumer's personality trait profile.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figures 1, 2:
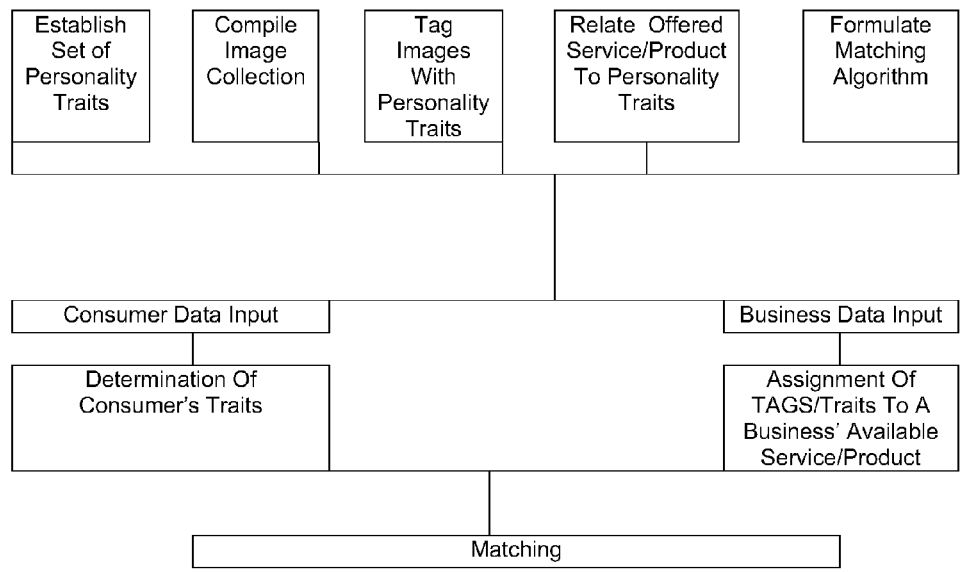
FIG. 1 is a flow diagram representation of a preferred embodiment of the present invention in the form of a method for consumer and business matching.
FIG. 2 provides a representative list of the personality traits identified and used by the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention generally relates to an improved method or system for matching consumers or individuals with businesses or competing suppliers or entities, both those which are service providers (e.g., restaurants, theaters, educational service providers, physicians) and those which are not (e.g., providers of events, experiences, products—i.e., merchants). Like prior matching services, the present invention requires the development of a database of the profiles of the businesses to be made available in the matching service to optimally find the businesses that can best provide the services, events, experiences and products which the consumer is seeking.

However, the present invention differs from prior matching services in that it also develops novel consumer profiles that contain far more than the standard data collected from consumers (e.g., contact information, information on the nature of the services, events, experiences or products being sought and related preferences (cost, location, style, etc.)). The present invention's consumer profiles also contain its novel identification of the personality traits of the consumer, especially those which the present inventors have found to be predictive of whether a consumer having any one of the many subsets of these traits is likely to enjoy the experiences (e.g. service, event, product, experiential activity) that the matching service provides or matches to the consumer. These personality traits are based on the clinical knowledge that personality traits are ubiquitous but also exist to varying degrees in each individual. Consequently, sets of dichotomous personality traits have been selected in order to measure the degree to which each user possesses distinct traits and preferences.

Additionally, the present inventors have formulated a means by which they can ascribe to the services, events, experiences and products, which are available from the businesses using the present invention, the personality traits which the consumers who select and are subsequently satisfied with them are most likely to possess. Thus, the present invention's identification of a consumer's personality traits and the appropriate ascribing of these same traits to the array of services, events, experiences and products of the businesses or competing suppliers using the present invention provides a novel means by which the present invention can perform its matching service so as to provide a consumer with a list of the businesses which are most likely to be able to be of interest to the consumer.

The pairing of consumers and businesses occurs when the present invention's system of artificial and interpretive intelligence analyzes these various consumer and business traits and algorithmically computes the best matches. A unique tagging or consumer association system of the present invention (e.g., entailing consumer selections of "me (i.e., the consumer associates him/her-self with the image)" or "not me" as he/she views a carousel of images that have predetermined and ranked or scored personality traits associated with each image) expresses a consumer's personality traits as arithmetic values which are then analyzed and matched against the similar arithmetic values that are ascribed to the present invention's available services, events, experiences and products to find optimal matches. This technology creates a new mechanism by which consumers can relate and connect to businesses. It also allows consumers to control the identity and relationship that is necessary to achieve a high value experience.

The present invention when implemented as part of a social media network allows its user or consumers to go beyond blogging, sharing photos, postings, social schedules and updates, and to engage and connect with businesses or others whose paths they may not have crossed but for the trait matching services of the present invention. It provides consumers with easy access to an expansive catalog of things to do and places to go and then helps get them there and enjoy the experience.

It focuses consumers on active engagement, instead of passive observation. It also has the ability to bring together friends and family, work associates, casual acquaintances and even like-minded strangers to engage in rewarding lifestyle activities that may be familiar or heretofore unknown. The present invention establishes a dynamic new relationship between consumers and businesses. The communications platform on which it is implemented allows people to more effectively organize family, social or business excursions; helps people make better decisions about where to go and what to do; improves time management and reduces the costs associated with an active lifestyle.

Similarly, for businesses, the present invention helps them attract new and repeat customers; improves the efficiency, productivity and costs associated with marketing, advertising and promoting a business; enhances customer service and satisfaction.

By potentially matching consumers and businesses based upon a shared affinity of purpose and interest, the communications platform of the present invention can serve as a lynch pin that connects a consumer preference with the optimal services, events, experiences or products and thereby become integral to facilitating many aspects of online commerce. Once the consumer profiles and ascription of traits to available services, events, experiences and products are complete, the present invention's matching service creates smart arrangements for consumers to enjoy social, recreational and travel experiences offered by selected businesses.

The present invention is a turnkey inquiry system that matches a consumer or user's personality traits and preferences with a merchant, event or activity; it is effectively a mobile concierge that matches inquiries with places to visit and things to do; it is a business and personality profile template that stores comprehensive information for the personal use and management of a consumer; it is a lifestyle management system that organizes, informs and directs the user to specific destinations. It is configurable in such a way that is available both as a mobile application on any smart phone and as an online web application.

In a preferred embodiment, the present invention is a method that is implementable on a computer that takes as its input simple consumer "me"/"not me" selections in response to a series of images (i.e., reproductions of what a human eye sees) that are in a carousel where one main image is displayed at a time and the consumer makes a selection according to whether the consumer identifies their preference and likelihood to typically participate in or be associated with the activity represented in the image under consideration; wherein each image being evaluated has been previously tagged/assigned certain ranked personality traits according to the matching service's perception of the psychological content of the images. These responses to the tagged images are stored and used to formulate the consumer's personality trait profile. These are then matched against a database of experiences that have been ascribed similar tags/personality traits and that are available from those businesses (e.g., providers of a wide range of services, events and experiential activities) which have registered with the database. The result of this matching is the compiling for the consumer of a list of ranked businesses from the business database which offer the experience being sought by the consumer and are most optimally matched to the consumer's personality trait profile. See FIG. 1 which shows a flow diagram representation of a preferred embodiment of the present invention in the form of a method for consumer and business matching.

It should be noted that the tagging aspect of the present invention is unique in that these personality traits are not disclosed to the user. The benefit of this is that the consumer is not "labeled" and cannot in any way bias this identification of his/her personality traits so as to seek to be matched with a particular type of experience or product. It can also be noted that this is the reverse of the typical tagging operation, because typically the user supplies the tags—but here, the user is not supplying any tags. Note should also be made of the relative simplicity of the present invention's tagging method as compared to the greater complexity involved with typical questionnaire format for collecting consumer and business inputs.

The data resulting from the consumer's responses to the tagged images eventually make up a significant portion of a consumer's profile and is stored in a database. When a consumer's personality traits profile is sufficiently identified, the consumer begins the present invention's matching process by executing a "find" or match function, and at that time the consumer's profile is processed in an algorithm that divides the total identified consumer traits by the total of all traits, and then does base pair matching against a database of available experiences (i.e., services, events, experiential activities) to which such traits are also correlated or ascribed so as to provide the consumer with a list of ranked businesses which offer the experience or item being sought by the consumer and matched to the consumer's personality.

To implement the present invention, there are certain key background steps or tasks that must be accomplished, these include:

(a) identifying and establishing, as a result of one knowledge's of the psychology literature, a set of personality traits that are predictive of how a consumer who possesses a subset of these personality traits is most likely to make a purchase or selection decision as it relates to choosing between an array of available experiences; a preferred embodiment of traits for the present invention is a set of 47 pairs of key traits, where each positive trait has a corresponding negative trait (e.g., passion vs. apathy), thus, there are 94 total traits. Other empirically tested personality indexes, such as The "Meyers-Briggs Type Indicator," also measure dichotomous traits resulting in 16 possible outcomes/variables. The 47 pairs of dichotomous traits in the present invention can result in an infinitely unique profile rather than the fixed categorical system known to the Meyers-Briggs. See FIG. 2 for a representative list of such personality traits; see also Berens & Nardi, "*The* 16 *Personality Types. Descriptions & Self-Discovery,*" Telos Publications, 1999.

Figure 3:
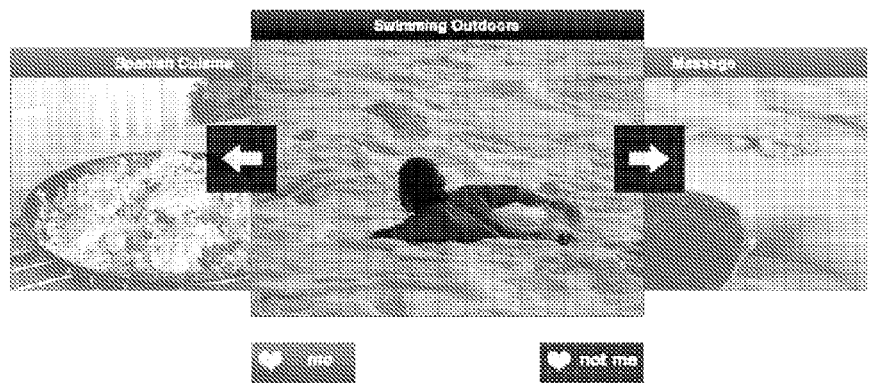
FIGS. 3(a)-3(c) provide representative images, shown in groups of three, that could be used by the present invention.
Figure 3:
Figure 3:
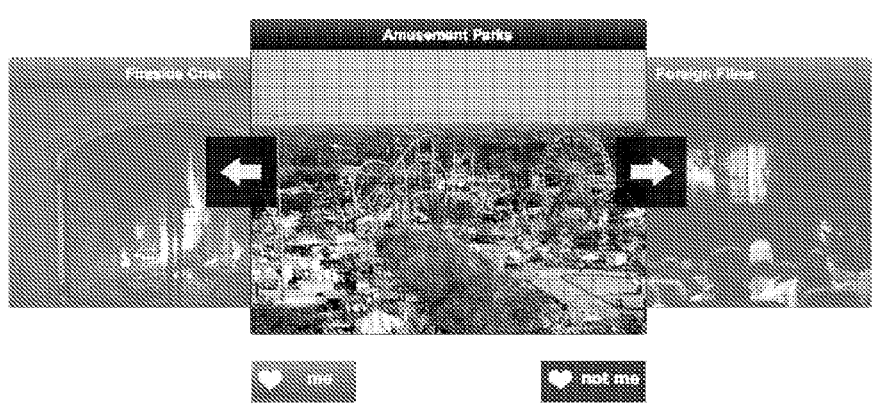
Figure 4:
FIG. 4 provides an example of an image to which has been applied the scoring or assignment process of the present invention.
Figure 5A:
FIGS. 5(a)-5(b) provide examples of the communications to businesses that are used to ascribe personality traits to the services or products offered by these businesses.
Figure 5B:
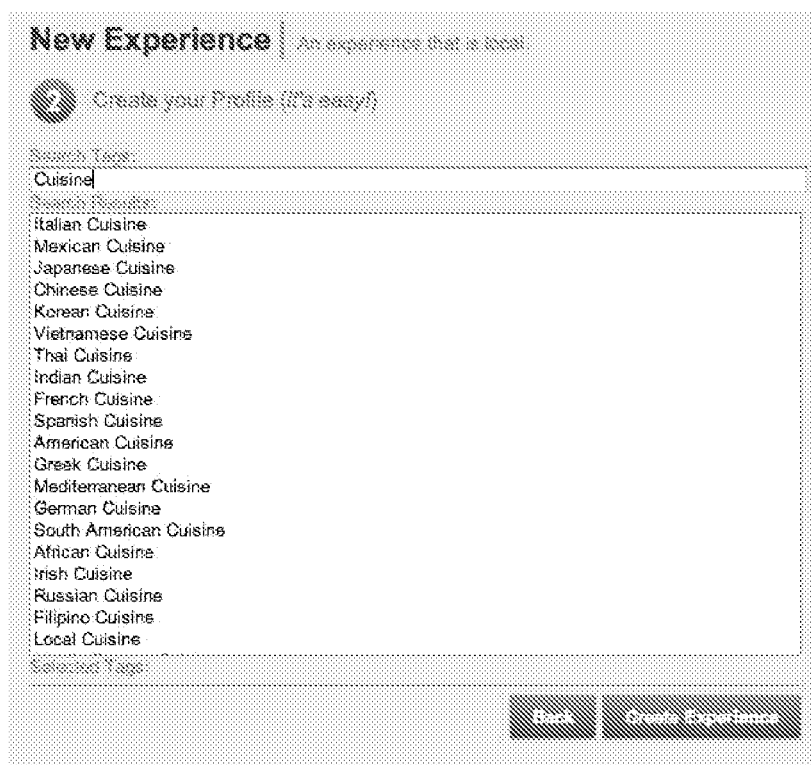
Figure 6:
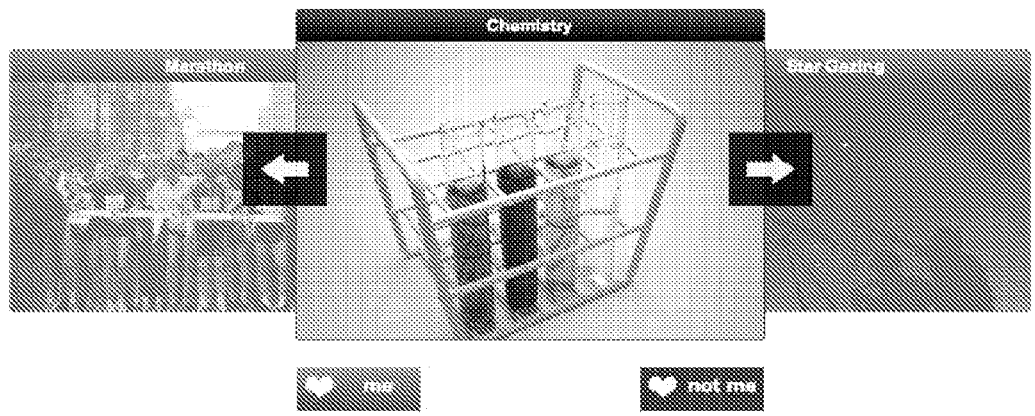
FIG. 6 is an example of a first image generated by the tag slider (the image carousel displaying the image to be evaluated) of the present invention and is used by the consumer to choose "me"/"not me" based on their intuitive response and preferences toward the image currently being displayed.
Figure 7:
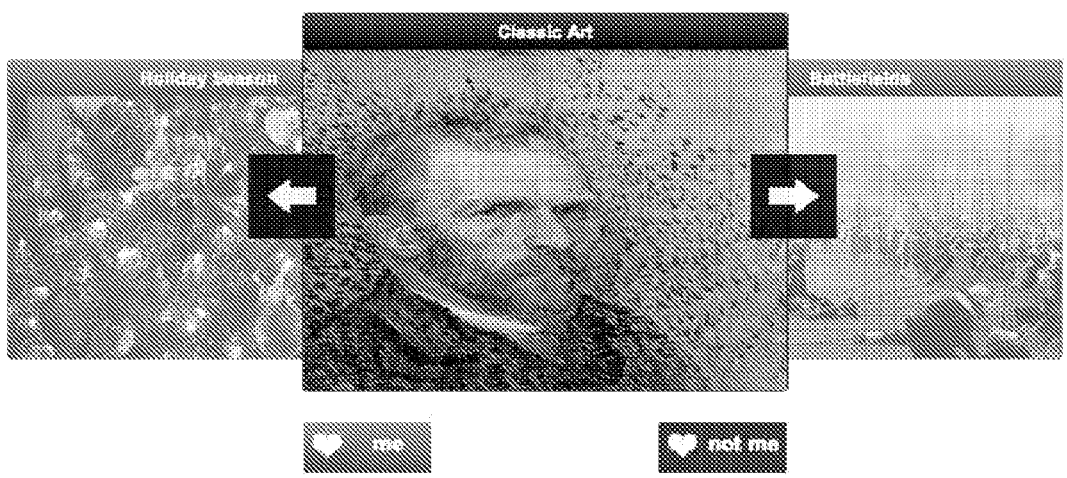
FIG. 7 is an example of a second image generated by the tag slider of the present invention.
Figure 8:
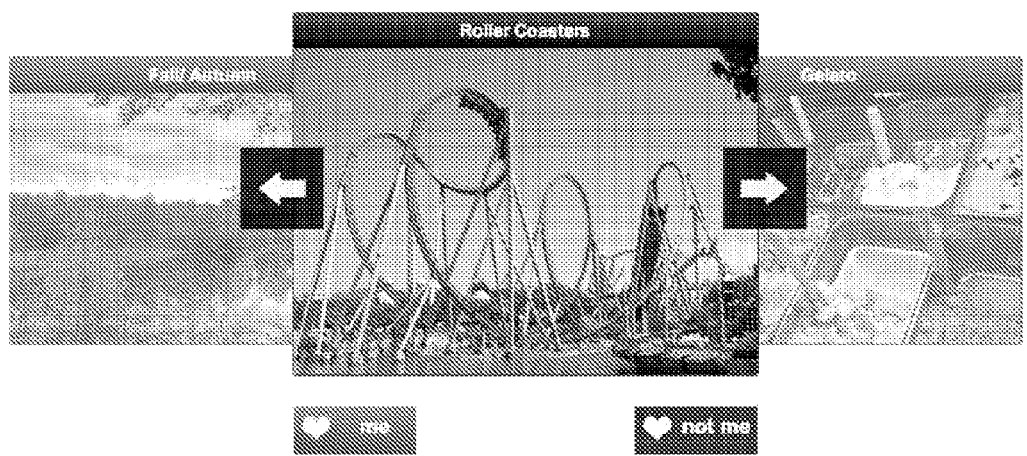
FIG. 8 is an example of a third image generated by the tag slider of the present invention.
Figure 9:
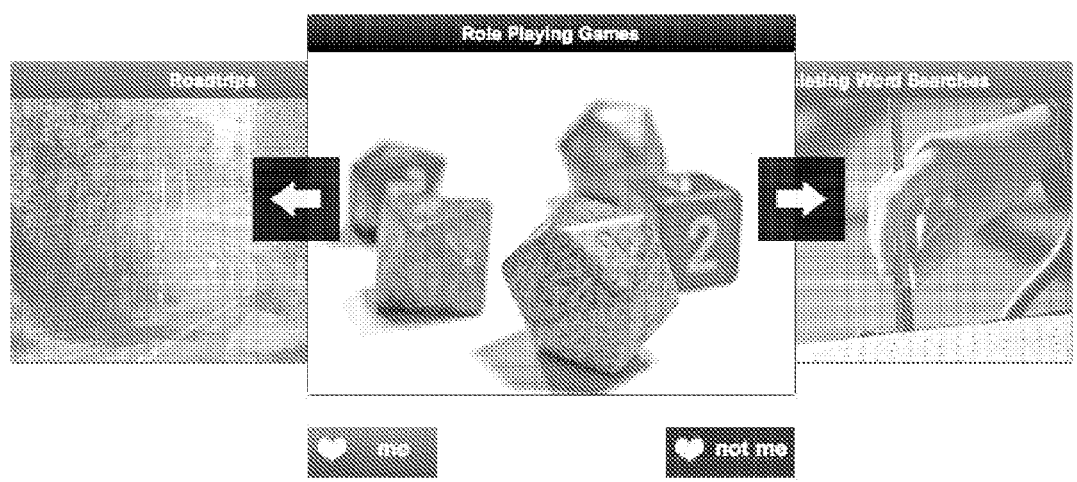
FIG. 9 is an example of a fourth image generated by the tag slider of the present invention.

(b) compiling a collection of images that are representative of an array of experiences, see FIGS. 3(*a*)-3(*c*) for a representative collection of such images and in which the images are being displayed in groups of three; notes also that our use of the term images should be given its broadest definition so as to include not just static, visual images, but also videos that may or may not have sound and even recording images of music and other types of sound, (c) scoring each of these images by assigning to each up to five ranked identified personality traits based, from a psychological viewpoint, on whether a consumer viewing the image would or would not be likely identify with or to elect to participate-in the experience or activity represented in the image; from trial and experimentation it was found that the optimal number of traits to be tagged to most images is five for computational efficiency (speed) and intelligence of the result (i.e. fewer traits that are tagged to an image resulted in less accurate results, and more traits that are tagged to an image did not result in materially better results), see FIG. 4 for an example of an image to which has been applied this scoring or assignment process, (d) causing a consumer to view these images and identify with which of these images the consumer elects to be associated, and then establishing, based upon the consumer's identified associations (or alternatively, using a specified first algorithm for relating selection associations with defined personality trait profiles) and the personality trait scoring of the images, a personality trait profile for the consumer; where the consumer could uses an image viewer, e.g., a website that provides this matching services and wherein the consumer uses his/her computer to access the internet and the website and to then view the images on the consumer's own monitor or display screen, (e) directing to businesses (i.e., experience providers) communications which require responses that are used to ascribe a business personality trait profile to each of these businesses and wherein these business personality trait profiles reflect the available experiences of these business and to which are ascribable the tags/personality traits which the consumers who select them are most likely to possess (or alternatively, using a specified second algorithm for relating a businesses' available experiences to their selectability by consumers sharing defined personality trait profiles), the result of this activity being the creation of a business profile database; see FIGS. 5(*a*)-5(*b*) for examples of the communications to businesses that are used to ascribe personality traits to the services or products offered by the businesses, and (e) formulating an algorithm with which to search this business profile database so as to efficiently identify within it those businesses whose experiences have the highest likelihood of being selected for purchase by a consumer having a specified set of personality traits or a specific personalality trait profile. A preferred embodiment of this required algorithm is given below:

$$\Delta = \sum \left( \left( \left( \frac{\mu}{\sum \mu} \right) * 100 \right) - \left( \left( \frac{\alpha}{\sum \alpha} \right) * 100 \right) \right)$$

$$\text{Match Percentage} = \left( \frac{\Delta}{\sum \Delta} \right) * 100$$

Where: μ=Consumer trait rating
α=item ascribed trait rating

After these background tasks are accomplished, one may proceed to the next stage in the implementation of the present invention which is the establishment of the guidelines for the collection of the required consumer information.

This involves guidance of the step in which a consumer views images from an image collection and responds as to whether the activity/experience represented in each image being viewed is something that the consumer would or would elect to participate-in. As shown in FIGS. 6-9, this step can be accomplished by causing images to slide across a screen and have the consumer click one of two clickable buttons ("Me" or "Not Me" with respect to whether the consumer viewing the image would or would not be likely to elect to participate-in the experience represented in the image).

It should also be noted that this consumer information collection task can include more that personality traits, e.g., in a preferred embodiment of the present invention there are approximately 100 "non-traitable" preferences that can be related to a consumer's desired experience.

Collecting and storing these responses and their implications for the assigned personality traits compiled for this consumer are a vital and novel portion of the consumer's profile.

It should also be noted that this "me/not me" selection task allows one to develop an understanding of what people do not prefer. "Me" and "not me" are equally as "acceptable." As much useful data and insight is provided from the "not me" responses as is provided by the "me" responses and can be used to aid in identifying many heretofore un-attempted matching tasks (e.g., matching supposedly attracted Opposites; matching areas outside one's comfort zone; helping one try something different; helping one explore the unenlightened you)

The final step in the present invention is to utilize its algorithm with the compiled consumer profile to search the business profile database so as to provide the consumer with a list of those businesses whose experiences have the highest likelihood of being selected or purchased from among the array of experiences available in the business profile database. This step can also involve allowing the consumer to filter the matches that will be reported to him according to various selection criteria (e.g., service range of item provider, price, weather conditions (when applicable)).

It should also be noted that the present invention is not limited to just consumer to business matching. It can also be used in many other areas.

For a first example, it can be used in the areas of human resource and workforce management planning—i.e., its matching abilities can be used to put teams of people together that have common interests or personality traits based on the present invention's input and analysis methods, or they can be used to determine companywide activities and who would go to which activities and enjoy them.

For a second example, the present invention can be seen to have many applications for educational service providers and educational institutions. It can be used to help students identify and decide upon many matters of interest, including: (a) career objectives, (b) courses of study, (c) colleges, universities or other educational entities which might best match with a particular student's interests and talents, (d) campus activities in which the student might enjoy participating, or (e) even find a roommate.

The career objectives or career finding application of the present invention is based on the rigorously tested Holland Occupational Themes, which categorizes users into six categories of career tracks. See John Holland, *Making Vocational Choices: A Theory of Careers*, Prentice Hall, 1973. With the Holland Themes, individuals answer questions about types of work on a Lichert scale (strongly disagree to strongly agree.), which differs from the present invention where its users respond "me" or "not me" to, for example, sixty carefully selected tagged visual image. Each tag has associated traits which correspond to six categories of career tracks. These categories are labeled: "Doers", "Planners", "Visionaries", "Helpers", "Creators" and "Analyzers."

Once a user/student responds to the sixty images or slides, his or her career personality profile is created by using the images' tags. One means for communicating this career personality profile to a user is a graph showing the user's scores in each of the six career categories of the present invention. The user will then typically be presented with a listing of the career matches that are generally considered to be compatibly matched to such a career personality profile.

In a 1996 study entitled "Relationships Between Holland's Vocational Typology, Schein's Career Anchors and Myers-Briggs' Types," Hilmar Nordvik demonstrated that the Holland Themes were also able to statistically predict almost all of the Myers-Briggs variables. This result gives one a high level of confidence that the present invention's measurement of career interests based on an assessment of one's personality traits is a viable and valuable new approach toward helping student's identify their optimal career paths. The present invention is a valuable contribution in this area because it utilizes a methodology that allows a student to use student-preferred assessment methods, i.e., visual observations and associations, rather than requiring the student to use the standard paper and pencil test methodologies. An additional benefit of the present invention is that a user can have their results almost instantaneously compared to the lengthy periods required to obtained results from pencil and paper scored tests.

For a third example, a version of the present invention can even be used to provide one with a personal shopping services in which the typical supplier database consists of detailed information regarding a supplier's products, and to these products are ascribed the typical personality traits of their satisfied buyers.

For a fourth example, the present invention can even be used to provide a matching service that enables people to meet each other (e.g., for the purposes of establishing dating relationships and/or friendships). This is achieved by causing these individuals to view and associate with or not associate with various scored images, thereby enabling a personality trait profile to be developed for each individual. These profiles are then matched according to historical matching data that indicates which profiles, when matched, have been shown to be the most likely to develop rewarding relationships.

In the broadest terminology, we can speak of the present invention as being a method or system for providing a matching service between an individual seeking something (e.g., product, service, experience, course of studies, roommate) and one of a plurality of other individuals or suppliers (e.g., retailers, service providers, educational institutions) who each can provide to a differing degrees the something being sought by the individual.

In a typical installation utilizing the present invention one would be expected to use a computer with a display system or video monitor that could be used to bring a consumer or individual into contact to the images that the consumer would be asked to evaluate for the purposes of allowing the consumer's personality trait profile to be determined. The processor of this computer would contain the software that would cause the various actions or process steps and data storing activities involved in implementing the present invention.

After the inventors have created the necessary suppliers' database, including the ascribing of personal traits to the suppliers' products/services, connection of such a computer to a network or the Internet would allow prospective users of the present invention to access a website on which would exist the various interfaces, resources and data collection means that would enable prospective users to access and use the present invention.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that are set forth in the claims to the invention.

We claim:
1. A method, performed by a computer of the type having a image viewer and a processor, for providing a matching service between an individual and a plurality of entities chosen from the group consisting of other individuals, matters, items, products or services needed or wanted by said individual, said method comprising the steps of:
   identifying dichotomous, personality traits that are predictive of how said individual that possesses said personality traits is most likely to be optimally matched, identifying a plurality of photographic images for viewing by said individual, wherein a plurality of said identified dichotomous personality traits are ranked and assigned to each of said plurality of photographic images based on psychological content of the respective photographic image, whereby an individual who chooses to be associated with a particular one of said plurality of photographic images can from a psychological perspective be assessed to possess said assigned plurality of said identified dichotomous personality traits, scoring each of said plurality of photographic images according to said ranked and assigned plurality of said identified dichotomous personality traits, utilizing said image viewer to present to said individual said plurality of photographic images and to identify with which of said plurality of photographic images said individual elects to be associated, utilizing said processor to establish, based upon those photographic images with which said individual elects to be associated and the scores of said plurality of photographic images, a personality trait profile for said individual, utilizing said processor to ascribe to each of said plurality of entities a plurality of said personality traits so as to develop for each specific entity from said plurality of entities a specific entity personality trait profile that is based on the plurality of personality traits shared by the majority of those individuals who, when confronted with the task of making a selection decision from among said plurality of entities, would select the entity having a specific one of said specific entity personality trait profiles, and utilizing said processor, with said individual established personality trait profile and said entity ascribed personality trait profiles, to match said individual with one of said plurality of entities.

2. A method for providing a matching service as recited in claim 1, wherein:

said plurality of entities chosen from said group is a plurality of other individuals, said entity ascribed personality trait profiles are a plurality of other individual personality trait profiles and in which each of said other individuals has a personality trait profile established by allowing each of said other individuals to view said plurality of images and identify with which of said plurality of images said other individual elects to be associated, and said steps in said method are configured to help match said individuals so as to form a group.

3. A method for providing a matching service as recited in claim 1, wherein:

said plurality of entities chosen from said group is a plurality of other individuals seeking to establish a relationship with another individual, said entity ascribed personality trait profiles are a plurality of other individual personality trait profiles and in which each of said other individuals has a profile established by allowing each of said other individuals to view said plurality of images and identify with which of said plurality of images said other individual elects to be associated, and said steps in said method are configured to help match said individual with one of said other individuals for the purpose of said individual and said one of other individuals forming a relationship.

4. A method for providing a matching service as recited in claim 1, wherein:

said plurality of entities chosen from said group is a plurality of matters including a plurality of possible career objectives for said individual who is a student, and said steps in said method are configured to help match said student with career objectives.

5. A method for providing a matching service as recited in claim 1, wherein:

said plurality of entities chosen from said group is a plurality of matters including a plurality of possible courses of study for said individual who is a student, and said steps in said method are configured to help match said student with a course of study.

6. A method for providing a matching service as recited in claim 1, wherein:

said plurality of entities chosen from said group is a plurality of matters including a plurality of possible campus activities for said individual who is a student, and said steps in said method are configured to help match said student with a campus activity.

7. A method for providing a matching service as recited in claim 1, wherein:

said plurality of entities chosen from said group is a plurality of matters including a plurality of educational entities which each have different offerings whose appeal to an individual depends on the interests and talents of said individual who is a student, and said steps in said method are configured to help match said student with an educational entity.

8. A method for providing a matching service as recited in claim 1, wherein:

said individual is a student who is seeking a roommate, said plurality of entities chosen from said group is a plurality of other student, said entity ascribed personality trait profiles are a plurality of other student personality trait profiles and in which each of said other students has a profile established by allowing each of said other students to view said plurality of images and identify with which of said plurality of images said other student elects to be associated, and said steps in said method are configured to help match said student with one of said other students as a roommate.

9. A method for providing a matching service as recited in claim 1, wherein:

said plurality of entities chosen from said group is a plurality of products for said individual who is one desiring personal shopping services, and said steps in said method are configured to help match said individual with said products.

10. A system for providing a matching service between an individual and a plurality of entities chosen from the group consisting of other individuals, matters, items, products or services needed or wanted by said individual, said system comprising:

an identified plurality of dichotomous, personality traits that are predictive of how said individual that possesses said personality traits is most likely to be optimally matched, an identified plurality of photographic images for viewing by said individual, wherein a plurality of identified dichotomous personality traits are ranked and assigned to each of said plurality of photographic images based on psychological content of the respective photographic image, whereby an individual who chooses to be associated with a particular one of said plurality of photographic images can from a psychological perspective be assessed to possess said assigned plurality of said identified dichotomous personality traits, scores for each of said plurality of photographic images according to said ranked and assigned plurality of said identified dichotomous personality traits, an image viewer configured to:
  present to said individual said plurality of photographic images so as to identify with which of said plurality of photographic images said individual elects to be associated, and a computer comprising a processor configured to:
  establish, based upon those photographic images with which said individual elects to be associated and the scores of said plurality of photographic images, a personality trait profile for said individual, utilizing said processor to ascribe to each of said plurality of entities a plurality of said personality traits so as to develop for each specific entity from among said plurality of entities a specific entity personality trait profile that is based on the plurality of personality traits shared by the majority of those individuals who, when confronted with the task of making a selection decision from among said plurality of entities, and
  match, with said individual established personality trait profile and said entity ascribed personality trait profiles, said individual with one of said plurality of entities.

11. The system for providing a matching service as recited in claim 10, wherein:
  said plurality of entities chosen from said group is a plurality of other individuals, and
  said entity ascribed personality trait profiles are a plurality of other individual personality trait profiles and in which each of said other individuals has a profile established by allowing each of said other individuals to view said plurality of images and identify with which of said plurality of images said other individual elects to be associated.

12. The system for providing a matching service as recited in claim 10,
  wherein said plurality of entities chosen from said group is a plurality of matters including a plurality of possible career objectives for said individual who is a student.

13. The system for providing a matching service as recited in claim 10,
  wherein said plurality of entities chosen from said group is a plurality of matters including a plurality of possible courses of study for said individual who is a student.

14. The system for providing a matching service as recited in claim 10,
  wherein said plurality of entities chosen from said group is a plurality of matters including a plurality of possible campus activities for said individual who is a student.

15. The system for providing a matching service as recited in claim 10,
  wherein said plurality of entities chosen from said group is a plurality of matters including a plurality of educational entities which each have different offerings whose appeal to an individual depends on the interests and talents of said individual who is a student.

16. The system for providing a matching service as recited in claim 10, wherein:
  said individual is a student who is seeking a roommate,
  said plurality of entities chosen from said group is a plurality of other student, and
  said entity ascribed personality trait profiles are a plurality of other student personality trait profiles and in which each of said other students has a profile established by allowing each of said other students to view said plurality of images and identify with which of said plurality of images said other student elects to be associated.

17. The system for providing a matching service as recited in claim 10,
  wherein said plurality of entities chosen from said group is a plurality of products for said individual who is one desiring personal shopping services.

* * * * *